No. 824,017. PATENTED JUNE 19, 1906.
F. J. HERDLE.
LOCKING SCREW.
APPLICATION FILED JAN. 2, 1904.
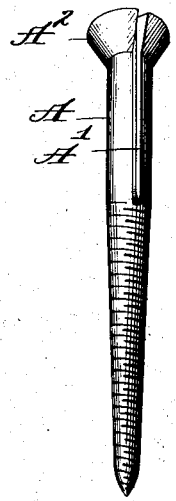
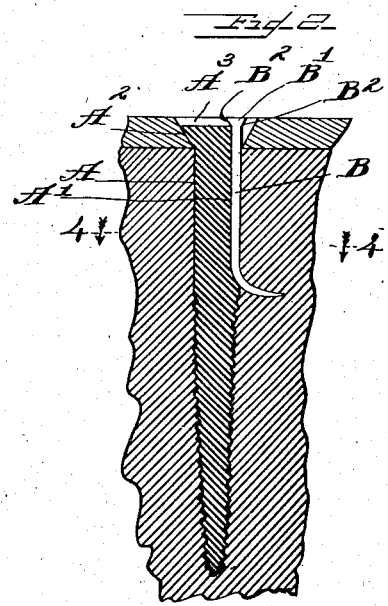
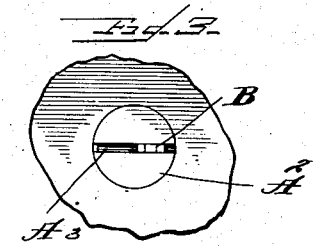
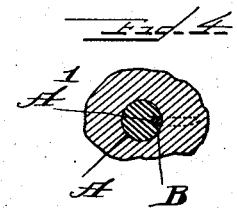
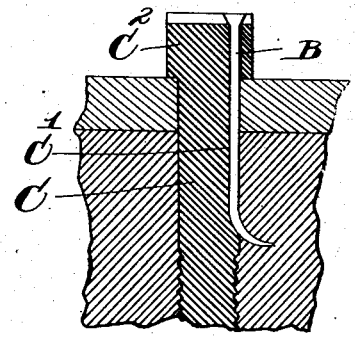

UNITED STATES PATENT OFFICE.

FREDERICK J. HERDLE, OF CHICAGO, ILLINOIS.

LOCKING-SCREW.

No. 824,017.

Specification of Letters Patent.

Patented June 19, 1906.

Application filed January 2, 1904. Serial No. 187,526.

*To all whom it may concern:*

Be it known that I, FREDERICK J. HERDLE, a citizen of the United States, residing at Chicago, in the county of Cook and State of Illinois, have invented certain new and useful Improvements in Locking-Screws, of which the following is a specification.

This invention relates to wood-screws, and refers particularly to a means for locking such screws against accidental withdrawal.

In car construction, in doors, and in other places where screws are used and are subject to vibration it is a well-known fact that screws soon become loosened and work out of their seats in the substance in which they are embedded.

It is the object of this invention to produce a means for locking a screw firmly in its surrounding material, which locking means may be withdrawn when it is desirable to remove the screw for any purpose, but which means is proof against accidental displacement.

In the accompanying drawings, Figure 1 is a perspective view of a screw embodying a portion of my invention. Fig. 2 is a sectional view showing said screw in use. Fig. 3 is a top plan view of this improved locking-screw. Fig. 4 is a section on dotted line 4 4 of Fig. 2. Fig. 5 is a sectional view showing the invention as applied to a lag-screw.

In the embodiment herein shown of this invention I provide a wood-screw A, having in its stem a longitudinally-extending groove A', which groove passes through the head $A^2$ of the screw and communicates with the slot $A^3$ in said head. The groove A' near its upper end—that is to say, near the head $A^2$ of the screw—is deeper than at its lower end, which is to provide a seat for the locking-nail to be next described, when the screw fits closely within an opening in metal or other hard or brittle material.

B is a locking-nail intended to be driven into the groove A' in the side of the screw after the latter is seated. This nail may be specially made to conform to the groove A' or it may be a common nail with a head B' narrow enough to enter the slot $A^3$ of the screw and having the undercut edges $B^2$, by means of which the nail may be grasped with suitable pliers (not shown) and withdrawn from its seat in the groove A'.

As hereinbefore stated, the groove becomes shallower toward its lower end, and when the nail B is driven into said groove the point of said nail is gradually turned outward, and when it encounters the extreme lower end of the groove A' the conformation of the latter is such as to turn the point of the nail quite abruptly into the surrounding wood or other substance in which the screw is seated. When it is desirable to release the locking means, the nail is removed in any suitable manner, as by a pair of narrow pincers, whereupon the screw may be readily withdrawn.

In Fig. 5 the invention is shown in its adaptation to a lag-screw. In this figure, C represents the lag-screw body, C' the groove therein, and $C^2$ the head.

Obviously the constructions hereinbefore described admit of further modifications without departing from the spirit and scope of my invention, wherefore I desire to have it understood that I do not limit myself to the precise details shown and described.

I claim as my invention—

In a locking wood-screw, in combination, a wood-screw having a longitudinal groove in its side extending from and through its head toward its point, said screw having a slot in its head for the reception of a driver, the upper end of said longitudinal groove opening into said slot, and the bottom of said groove at its lower end turning out abruptly; and a locking-nail of greater length than said groove and having a point adapted to be bent by impingement upon the lower end wall of said groove, whereby when said nail is driven into said groove the point of the nail will be forced into the surrounding wood and thus lock said screw against withdrawal, said nail having a head adapted to lie within the slot in the head of the screw.

FREDERICK J. HERDLE.

Witnesses:
T. M. BATES,
GEORGE L. CHINDAHL.